Sept. 6, 1960  A. L. WEST  2,951,551
AIR PURIFYING CANISTER
Filed Nov. 12, 1957

INVENTOR.
Allan L. West
BY
ATTORNEY

United States Patent Office 2,951,551
Patented Sept. 6, 1960

2,951,551

AIR PURIFYING CANISTER

Allan L. West, Bel Air, Md., assignor to the United States of America as represented by the Secretary of the Army Filed Nov. 12, 1957, Ser. No. 696,001

5 Claims. (Cl. 183—4.3)

(Granted under Title 35, U.S. Code (1952), sec. 266)

The invention described herein may be manufactured and used by or for the Government of the United States of America for governmental purposes without the payment to me of any royalty thereon.

This invention relates to a plural-unit air purifying canister arrangement so constructed that the air flows in parallel through the units into a centrally located tube from whence it passes to a gas mask or other point of use.

It is an object of this invention to provide a multi-unit canister of the type described above in which the flow of air through the various units is substantially uniform.

It is another object of this invention to provide a canister unit for use in the above type canister so constructed that any number of units may be readily assembled to form a canister of desired capacity.

Figure 1:
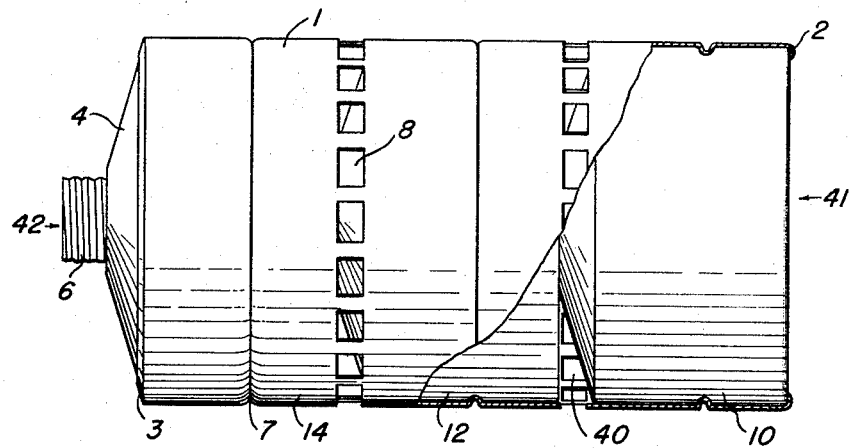
Fig. 1 is a side view of a three unit air-purifying canister, part of the outer casing being broken away.
Figure 2:
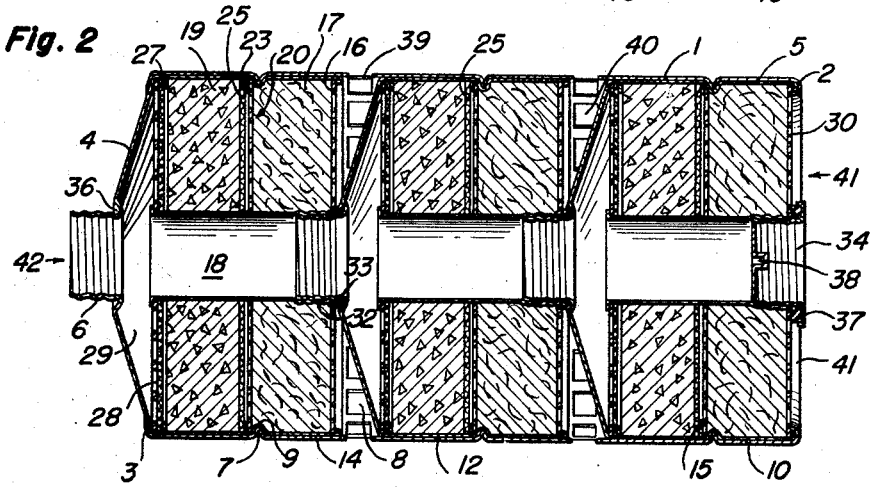
Fig. 2 is a longitudinal sectional view of the canister.
Figure 3:
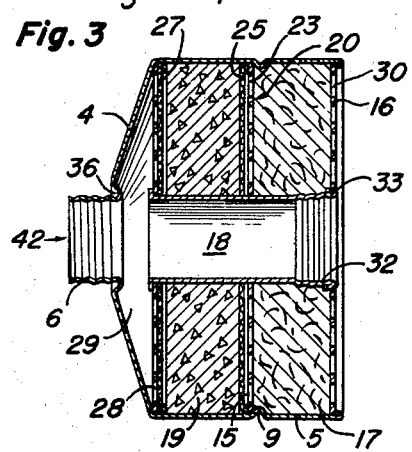
Fig. 3 is a longitudinal sectional view of a single air-purifying unit.

The canister comprises a casing 1 cylindrical in form having open ends crimped at 2 and 3 to retain a plurality of air-purifying units which are described below. This casing 1 has perforations 8 about the circumference of the canister, which permit air to enter the air spaces 40 between units 10, 12, and 14. The casing 1 has on its surface circumferentially-indented beads 7 embossed tightly about each individual unit to match the bead 9 in the wall of the unit to hold said units in a sturdy, non-rattling assembly so that the gas tight connections between the units will not be broken by rough handling. Indented beads 39 may also be located adjacent to the perforations 8. The indented beads 7 and 39 are formed after the assembled units 10, 12, and 14 are inserted into the casing 1.

Each unit comprises a generally cylindrical housing, or body 5 having perforated retainer plate 16 at one end and a frusto-conical end wall 4, having an externally threaded discharge spigot 6, at the other end. Within each unit there is an aerosol filter compartment 17 pierced by a central tube 18 and an adsorbent layer compartment 19 pierced by the same central tube 18. The adsorbent layer compartment 19 is adjacent to the aerosol filter compartment 17 with a perforated retainer assembly 20 between said compartments to hold the adsorbent layer firmly in position and to form one side of the aerosol filter compartment 17. The retainer assembly 20 comprises a retaining screen 25 adjacent to the adsorbent layer compartment 19, a screen retainer 15, and a center spacer 23. The center spacer 23 is corrugated to permit radial distribution of the air at the point in order to obtain minimum resistance to flow. Bead 9 holds the retainer assembly firmly in place against the adsorbent.

The adsorbent layer in compartment 19 is preferably a mass of activated charcoal which may be impregnated with metallic oxides such as copper, silver, and/or chromium. The aerosol filter in compartment 17 may be a mass of organic fibers also including, preferably, fine fibers of glass or asbestos. Alternatively a folded or pleated sheet of filter material formed of the above materials may be employed.

The perforated filter guard or retainer plate 16 and the center spacer 23 are held perpendicular to the central tube 18 to form two sides of the aerosol filter compartment 17 while the outer boundary of said compartment is formed by the housing 5. The retaining screen 25 and the fines filter 27 which are held perpendicular to the center tube 18, form two sides of each adsorbent layer compartment 19 while the inner and outer boundaries of said compartment are formed by the center tube 18 and the housing 5, respectively. The fines filter 27 is between the adsorbent layer compartment 19 and the perforated top spacer 28. The fines filter 27 comprises a sheet of cotton or synthetic fibrous material and prevents small particles from the adsorbent layer compartment 19 being passed out the discharge spigot 6.

A plenum chamber 29 is located between the perforated spacer 28 and the frusto conical end wall 4 of the unit so that the purified air can flow from adsorbent layer compartment 19 through to the discharge spigot 6 and thence, in the case of units 10 and 12, to the central tube 18 of the next unit 12 or 14. At the end of each unit, opposite spigot 6, there are internal threads 32 on tube 18 and raised bead 33. Internal threads 32 are made to match the external threads on spigot 6. This arrangement permits two or more units to be joined together end-to-end ad infinitum. The end is fitted with a plug 34. The annular channel 36 of the unit, which can be fitted with a gasket corresponding to gasket 37 of the plug, will cooperate with the raised bead 33 of the next unit to make an air tight seal. The combination of bead 33 and channel 36 increases the rigidity of the structure. Each plug 34 has an indenture 38 which can be fitted by a tool so as to enable one to turn the plug, thereby sealing the center tube 18. Thus any number of units can be assembled to form a composite canister of desired capacity.

The mode of operation is as follows. Air enters either the open end 41 of the multiple unit canister or through the perforations 8, about the circumference of the canister, into the air spaces 40. This air passes through the holes 30 in the filter guards 16 into the aerosol filter compartments 17. The air flows through the spacers 23 of retainer assembly 20 and then through the screens 25 into the adsorbent layer compartments 19. It then passes through the adsorbent layer compartment 19, fines filter 27, and the perforated spacer 28, into the plenum chamber 29, where the air, now purified, flows through the discharge spigot 6. It will be noted that the air flows in parallel through all the units. Those units closest to the final effluent end 42 carry purified air from all more remote units thru their center tubes 18. Since the air from all the units must emerge at the spigot 6 at the effluent end 42, spigot 6 of unit 14 may be enlarged to ease the flow of air from the canister.

While I have described one embodiment of my invention in considerable detail, it will be obvious that various changes are possible. I therefore wish my invention to be limited solely by the scope of the appended claims.

I claim:

1. An air purifying canister comprising a series of units connected end to end, each of said units comprising an outer housing open at a first end and having an end wall at a second end, a discharge spigot centrally located on said end wall, connecting means on said discharge spigot, a discharge tube supported by and substantially coaxial with said housing, said tube having a first end substantially at said first end of said housing and a second end within said housing and adjacent to but spaced from said end wall, air purifying means supported between said tube and said housing, and spaced from said end wall, connecting means on said first end of said tube, the connecting means on the spigot of one unit being connected to the connecting means on said first end of the central tube of the next unit, the end wall of each unit, the spigot, and the connecting means being so constructed and arranged as to permit air to enter said air purifying means at said first end of each unit, and closure means in said first end of said central tube of the first unit of said series.

2. A canister unit comprising a housing open at a first end and having an end wall at a second end, a discharge spigot centrally positioned in said end wall, a tube supported by and substantially coaxial with said housing, said tube having a first end at said first end of said housing and a second end within said housing and adjacent to but spaced from said end wall, and air purifying means between said housing and said tube and spaced from said end wall, said air purifying means being open to the atmosphere at said first end of said housing exteriorly of said tube, external threads on said spigot and matching internal threads in said first end of said tube, whereby a plurality of said units may be joined in end to end relationship.

3. An air purifying canister unit as described in claim 2 wherein; said air purifying means comprises a first compartment and a second compartment, said first compartment being connected to said open first end of said canister housing and being bounded on two parallel sides by a perforated filter guard and a perforated center spacer which are perpendicular to the axis of said tube and bounded on the other two sides by said housing and said tube, said second compartment being bounded on two parallel sides by a retainer screen and fines filter which are perpendicular to the axis of said tube, and bounded on the other two sides by said housing and said tube, said compartments being separated from each other by a retainer assembly; an aerosol filter in the first of said two compartments, said aerosol filter comprising a mass of organic fibers, an adsorbent layer in the second of said two compartments, said adsorbent layer comprising a mass of activated charcoal.

4. A canister as defined in claim 1 and further comprising a cylindrical casing surrounding the canister units, said casing being open at its ends and having, intermediate said ends, a series of indented beads shrunk tightly about each of the said canister units, a series of perforations in said cylindrical casing between the units of the canister, whereby air may be permitted to enter each of said units, said casing being crimped at its ends about the respective units to form a rigid structure.

5. A canister unit comprising a housing open at a first end and having an end wall at a second end, a discharge spigot centrally positioned in said end wall, a tube supported in and substantially coaxial with said housing, said tube having a first end at said first end of said housing and a second end within said housing and spaced from said end wall, a perforated filter guard positioned at said first end of said housing and extending from said housing to said tube, a perforated top spacer positioned at an interval from said second end of said housing and extending from said housing to said tube, a fines filter located adjacent to said perforated top spacer and extending from said housing to said tube, a retainer assembly located between said filter guard and top spacer, said retainer assembly comprising a screen, a screen retainer and a perforated center spacer, said perforated filter guard and retainer assembly defining a first compartment bounded by said perforated filter guard and said perforated center spacer of said retainer assembly, and said housing and tube, an aerosol filter in said first compartment comprising a mass of organic fibers, said fines filter and said retainer assembly further defining a second compartment bounded by said fines filter and said retainer screen of said retainer assembly and said housing and tube, and an adsorbent layer in said second compartment comprising a mass of activated charcoal.

References Cited in the file of this patent

UNITED STATES PATENTS

| 2,442,356 | Gross | June 1, 1948 |
| 2,671,528 | Gross | Mar. 9, 1954 |

FOREIGN PATENTS

| 238,135 | Great Britain | Aug. 13, 1925 |
| 396,360 | Great Britain | Sept. 11, 1933 |
| | (Complete not accepted.) | |
| 694,423 | Germany | Aug. 1, 1940 |
| 976,720 | France | Nov. 1, 1950 |